Patented May 10, 1932

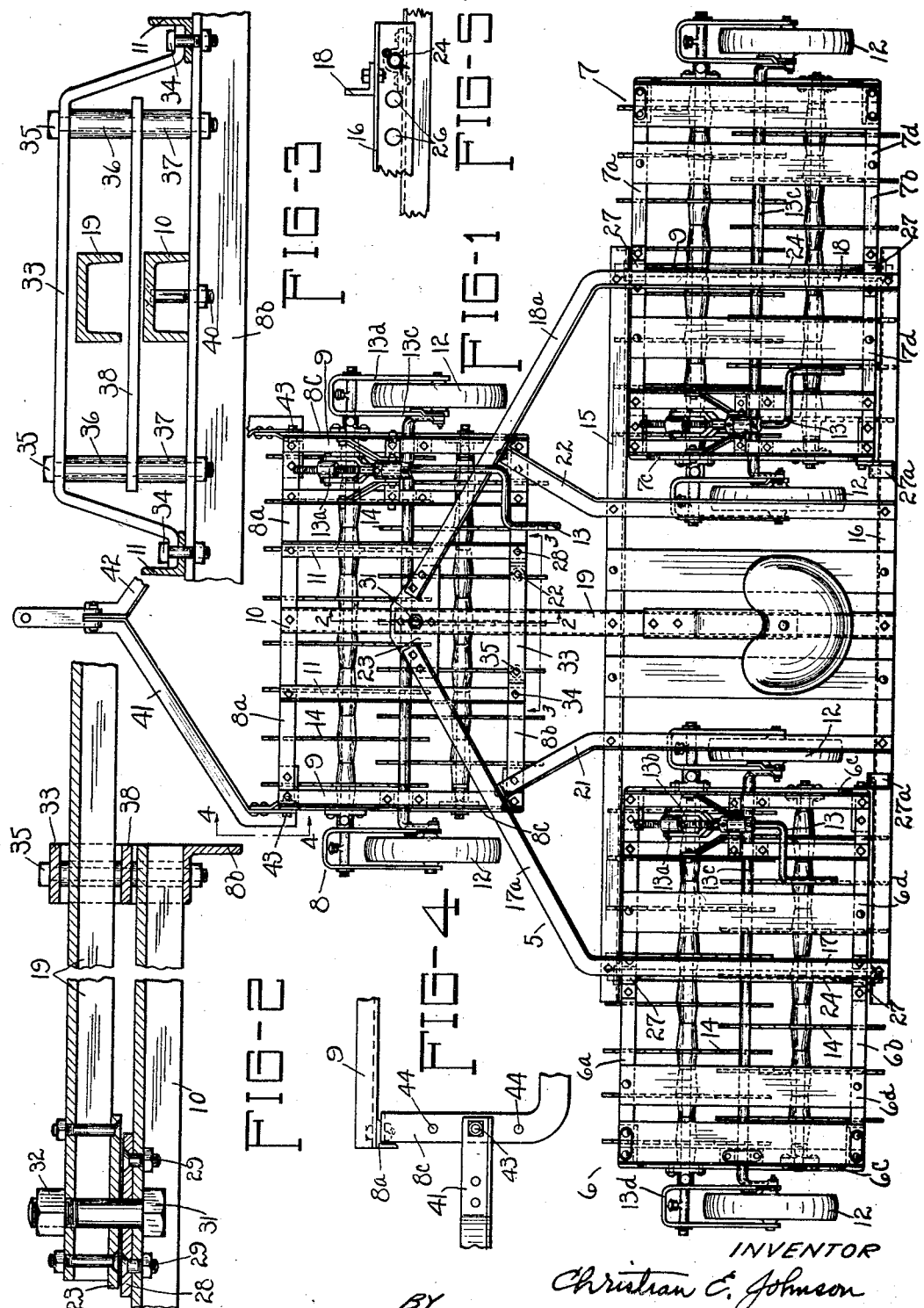

1,857,384

UNITED STATES PATENT OFFICE

CHRISTIAN E. JOHNSON, OF MOLINE, ILLINOIS, ASSIGNOR TO DEERE & COMPANY, OF MOLINE, ILLINOIS, A CORPORATION OF ILLINOIS

CULTIVATING IMPLEMENT

Application filed September 16, 1929. Serial No. 392,758.

This invention relates to cultivating implements of the type commonly known as rotary hoes. Such implements usually comprise a wheeled frame having one or more transversely extending shafts on which closely spaced rotating hoe wheels are mounted, the latter having long, radially extending teeth adapted to enter the soil in the forward rolling motion of the hoe wheels over the ground. Such implements are frequently used in the cultivation of corn and like plants, having particular utility for breaking up crusty soil in the first or second cultivating operations.

The present invention is concerned more particularly with the construction of a rotary hoe implement of relatively wide span adapted for the cultivation of three or more corn rows, and is characterized by the use of three gangs or sections of such rotary hoes, said gangs being connected together by a suitable frame in such a manner that two of said gangs are spaced apart and located in rear of the third gang which is so positioned with relation to the rear gangs that it will cultivate the ground in the space between the two rear gangs. Another characteristic feature of the invention is that each of said gangs or sections is itself separately supported on the ground when in transport position.

One of the principal objects of the invention is to connect the three gangs together through an improved frame structure in a flexible relation, whereby the gangs are capable of certain independent rocking movements which better adapt them to travel over uneven ground and which secure more uniform cultivation and an easier handling of the implement.

Another object of my invention is the provision of improved pivotal connecting means between the front gang and the frame so as to make turning of the implement easy, whether it be traveling in working or in transport position.

Still another object of my invention to provide such an implement comprising three hoe gangs in which each of said gangs is supported on its own carrying wheels, thereby permitting the connecting framework to be of much lighter material than would be necessary if the gangs were supported by the framework when in transport position and the framework supported on carrying wheels.

A further object of the invention is to provide for adjustable lateral spacing of the two rear gangs to accommodate different spacing between rows of crops.

A still further object of the invention is the provision of means whereby each of the rear hoe gangs may oscillate on a longitudinal axis relative to the frame of the implement, and also to provide such a connection between the front hoe gang and the frame as to give such gang the necessary flexibility for oscillation about a longitudinal axis as well as about a transverse axis.

A still further object of the invention is the provision of stop means for limiting the lateral swinging of the front gang relative to the frame; also the provision of stop means for limiting the relative vertical movement between the rear gangs and the front gang.

Further objects and advantageous features will appear from the following description of a preferred embodiment of my invention illustrated in the accompanying drawings, in which—

Figure 1 is a plan view of my improved implement illustrating the positions of the three hoe gangs and their connections with the frame;

Figure 2 is a cross-sectional view taken on the line 2—2 of Figure 1 and illustrating the pivotal connection between the front portion of the frame and the front hoe gang;

Figure 3 is a cross-sectional view taken on the line 3—3 of Figure 1, and illustrating the stop means for preventing horizontal swinging of the front hoe gang on its pivot beyond a predetermined point in either direction;

Figure 4 is a view taken on the line 4—4 of Figure 1, and illustrating the means for connecting the draft frame with the frame of the front gang; and Figure 5 is a fragmentary rear view illustrating the connection between the rear gangs and the main frame.

My improved implement comprises a frame indicated as a whole by the reference numeral 5, and to such frame are suitably connected in a manner hereinafter described three rotary hoe gangs or sections 6, 7 and 8, the gangs 6 and 7 being connected with the rear portion of said frame and being spaced apart as shown, while the gang 8 is connected with the forward portion of said frame and is so positioned with respect to the two rear gangs 6 and 7 that it will cultivate the ground between said gangs. These several hoe gangs are substantially similar in construction to that shown in my pending application, Serial No. 360,851, filed May 6, 1929, and in the application of Carl F. Bauer, Serial No. 250,205, filed January 28, 1928, so that they need only be briefly described herein.

The rear gang 6 comprises front and rear transversely extending angle bars 6a, 6b, respectively, connected together at their ends by longitudinally extending U-shaped frame members 6c, and also braced intermediately by longitudinally extending boards 6d. The rear gang 7 is similar in construction to the gang 6 and comprises front and rear transversely extending angle bars 7a, 7b, respectively, connected together at their ends by longitudinally extending U-shaped frame members 7c, and intermediate longitudinally extending boards 7d. The frame of the front gang 8 of the implement is slightly different in construction from that of the two rear gangs 6 and 7 for a purpose which will be apparent later, and it comprises front and rear transversely extending angle bars 8a, 8b, respectively, suitably connected together at their ends by longitudinally extending U-shaped frame members 8c and also by longitudinally extending angle bars 9. The angle bars 8a, 8b are also suitably connected together and braced by a centrally located longitudinally extending member in the form of a channel bar 10, and they are further connected together and braced by longitudinally extending angle bars 11 positioned, respectively, intermediately between the central bar 10 and each of the end bars 9.

Each of the three gangs 6, 7 and 8 is suitably supported on a pair of carrying wheels 12, one located at each end of the frame thereof, and each of said gangs is provided with a crank screw 13 by which the carrying wheels of the gang are moved upward or downward relative to the frame of the gang so as to move the hoe wheels carried by the gang frame into cultivating position or transport position, as the case may be. The general construction of each crank screw operating means is substantially similar to that shown in my above mentioned application, Serial No. 360,851, so that it will not be necessary to describe the construction of the several parts thereof in specific detail. It will suffice to say that a nut 13a threading along the crank screw swings a yoke 13b in which the nut is mounted, which yoke rocks a transverse shaft 13c, the ends of which are connected to wing upwardly or downwardly the two U-shaped yokes 13d in which the supporting wheels 12 are mounted. The hoe wheels of the several gangs are indicated by the reference numerals 14, the same being mounted for independent rotation on two transverse shafts carried by each gang frame.

Coming now to the improvements which form the subject-matter of the present invention, the frame 5 of the implement comprises two transverse members 15 and 16 in the form of angle bars connected together near their ends by longitudinally extending members also in the form of angle bars 17, 18 suitably bolted thereto and having their forward ends, indicated, respectively, by the reference numerals 17a, 18a, extended beyond the front transverse bar 15 and bent angularly towards each other as shown. The members 15 and 16 are also connected together by a centrally located longitudinally extending member in the form of a channel bar 19 which is bolted to said transverse members and extends forwardly from the front transverse member 15 as shown, for a purpose to be hereinafter described. The members 15 and 16 are further connected together and braced by suitable brace members in the form of angle bars 21, 22 bolted thereto and located intermediately between the centrally located bar 19 and the bars 17 and 18, respectively. The forward portions of the angle bars 21, 22 extend beyond the front transverse member 15 and are bent angularly toward the converging ends 17a and 18a of the side angle bars, being secured to the intermediate portions thereof. The forward ends of the angle bar portions 17a, 18a, and the forward end of the central member 19 of the frame are rigidly connected to a bearing plate 23 by bolts, as shown.

It will thus be seen that a rigid frame construction is provided for the several gangs of the implement.

Each of the two rear gangs 6 and 7 is pivotally supported on the frame 5 for transverse rocking movement about a longitudinally extending pivot shaft 24 which is supported on the outer end of the frame 5, the front and rear ends of such pivot shafts being journaled in one of a series of holes 26 in the vertical flange of members 15 and 16, and being held against endwise movement by cotter pins. This series of holes 26 in each of the members 15, 16 is provided so that the gangs 6 and 7 may be adjusted laterally toward or from each other to vary the spacing between the gangs to accommodate the different spacing of row crops. The front and rear angle bars 6a, 6b of the gang 6, and the front and rear angle bars 7a, 7b of the gang 7 have pivot brackets 27 suitably secured thereto as by bolts or rivets, which pivot brackets have pivotal mounting on the adjacent shaft 24. By this construction a flexible relation is established between the hoe wheels of the gangs 6 and 7 at opposite sides of the rear portion of the implement, whereby the inner and outer ends of each gang or section of hoe wheels can rise or fall independently of the other gang in passing over uneven ground.

Stop brackets 27a are secured to the inner ends of the two rear gang frames and are adapted to engage the main frame bar 16 for limiting such transverse rocking movement of the two rear gangs. This pivotal mounting of the hoe gangs 6 and 7 on the frame 5 is somewhat similar to that shown and described in the pending application of Virgil F. Bozeman, Serial No. 253,835, filed February 13, 1928.

The front gang 8 of the implement is pivotally connected to the frame 5 in the following manner: The bearing plate 23 before described, to which the forward ends of the channel bar 19 and the angle bars 17a and 18a of the frame are rigidly connected, rests on a companion bearing plate 28, see Figure 2, which is rigidly secured by means of bolts 29 upon the longitudinally extending channel bar 10 of the front gang 8, and passing through the channel bar 10, the bearing plate 23, the bearing plate 28 and the channel bar 19, as shown in said figure, is a pivot bolt 31 which is held in position by a nut 32. It will be seen, therefore, that the front gang 8 of the implement is pivotally connected with the frame 5 of the implement in such a manner that it may swing horizontally relatively to the frame in the turning of the implement.

It may be mentioned at this point that there is sufficient looseness and play in this pivotal connection of the front gang 8 with the frame 5 to give such gang the necessary flexibility both for oscillation about a longitudinal axis as well as about a transverse axis. Such flexibility enables the front gang to rock laterally and fore and aft independently of the rear gangs in traveling over uneven ground. Extending upwardly from the rear transverse angle bar 8b of the gang 8 is an inverted U-shaped bar 33 having a horizontally extending portion positioned above the centrally located channel bar 19 of the frame 5, and having its opposite lower ends secured to the longitudinally extending angle bars or braces 11 which are positioned on opposite sides of the centrally located channel member 10 of the gang 8, as shown in Figure 3. These lower ends of the U-shaped bar are secured to said angle bars 11 by bolts 34 which also secure the angle bars 11 to the transverse angle bar 8b, such bolts passing through all three of these parts, thereby securely connecting them together. Extending between each end of the horizontal portion of the inverted U-shaped member 33 and the transverse angle bar 8b is a comparatively long, vertically extending bolt 35, these two bolts being each provided with a pair of spacing sleeves 36 and 37, as shown in Figure 3.

Extending transversely and having its opposite ends embracing said bolts is a horizontally extending plate 38 which is positioned between the spacing sleeves 36 and 37 at either end so as to lie between the channel member 19 of the frame and the central channel member 10 of the front gang 8, as shown in said figure. It will be readily apparent from the foregoing that the sleeves 36 will act as stop members for limiting the lateral swinging movement on the pivot bolt 31 of the front gang 8 with respect to the central channel member 19 of the frame; also that the bar 33 and the plate 38 act as stops to limit the relative vertical movement of the frame and the rear gangs with respect to the front gang of the implement. 40 indicates the bolt for fastening the rear end of the front gang channel 10 to the transverse bar 8b.

The draft force is applied to the implement through a suitable draft frame comprising members 41, 42 which are pivotally connected by pivot bolts 43 to the U-shaped frame members 8c depending from opposite sides of the front gang 8. As shown in Figure 4, these U-shaped members 8c are provided with a series of holes 44 for adjusting the height of the hitch point as desired.

It will be seen from the foregoing that the present construction permits the two rear gangs to rock laterally about the longitudinal axes 24 independently of each other, permits lateral rocking of the front gang, permits relative fore and aft rocking between the front gang and the frame, and permits the row spacing between the two rear gangs to be varied.

Having thus described my invention what I claim as new is:

1. A rotary hoe implement comprising a frame, a pair of hoe gangs connected with the rear portion of said frame, means connecting said gangs with said frame permitting lateral adjustment of said gangs relative to said frame for varying the spacing between said gangs, and a front hoe gang pivotally connected with the front portion of said frame.

2. A rotary hoe implement comprising a frame, a pair of hoe gangs connected with the rear portion of said frame, a front hoe gang pivotally connected with the front portion of said frame for horizontal angular movement relative thereto, and means for limiting the vertical movement of the rear hoe gangs with respect to the front hoe gang.

3. A rotary hoe implement comprising a frame, a pair of hoe gangs connected with the rear portion of said frame, a front hoe gang pivotally connected with the front portion of said frame for horizontal angular movement relative thereto, means for limiting the horizontal movement of the front hoe gang with respect to the frame, and means for limiting the vertical movement of the rear hoe gangs with respect to the front hoe gang.

4. A rotary hoe implement comprising a frame, pivot means connected with the rear portion of said frame at opposite sides thereof, a hoe gang mounted on each of said pivot means for transverse rocking movement thereon, means connecting said pivot means with said frame for varying the spacing between said gangs, and a front hoe gang connected with the front portion of said frame.

5. A rotary hoe implement comprising a frame, pivot means connected with the rear portion of said frame at opposite sides thereof, a hoe gang mounted on each of said pivot means for transverse rocking movement thereon, means connecting said pivot means with said frame for varying the spacing between said gangs, and a front hoe gang pivotally connected with the front portion of said frame.

6. A rotary hoe implement comprising a frame, a pair of hoe gangs connected with the rear portion of said frame, a front hoe gang, means for pivotally connecting said front hoe gang with said frame, said means comprising a bearing plate secured to the front portion of said frame, a second bearing plate secured to said front hoe gang, one of said bearing plates resting on the other, and a pivot bolt extending through said bearing plates and connecting said front hoe gang to said frame.

7. A rotary hoe implement comprising a frame, a pair of hoe gangs connected with the rear portion of said frame for transverse rocking movement relatively thereto, a front hoe gang pivotally connected with the front portion of said frame for horizontal angular movement relatively thereto, and means mounted on said front hoe gang for limiting the vertical movement of the rear hoe gangs with respect to the front hoe gang.

8. A rotary hoe implement comprising a frame, a pair of hoe gangs connected with the rear portion of said frame for transverse rocking movement relatively thereto, a front hoe gang pivotally connected with the front portion of said frame for horizontal angular movement relatively thereto, means mounted on said front hoe gang for limiting the vertical movement of the rear hoe gangs with respect to the front hoe gang, and means associated with said first-mentioned means for limiting the horizontal angular movement of the front hoe gang with respect to said frame.

9. A rotary hoe implement comprising a frame, a pair of hoe gangs connected with the rear portion of said frame for transverse rocking movement, means connecting said gangs with said frame permitting lateral adjustment of said gangs relative to said frame for varying the spacing between said gangs, a front hoe gang pivotally connected with the front portion of said frame for horizontal angular movement relatively thereto, means mounted on said front hoe gang for limiting the vertical movement of the rear hoe gangs with respect to the front hoe gang, and means associated with said first-mentioned means for limiting the horizontal angular movement of the front hoe gang with respect to said frame.

In witness whereof, I hereunto subscribe my name this 13th day of September, 1929.

CHRISTIAN E. JOHNSON.